United States Patent
Leiber

(10) Patent No.: US 8,069,203 B2
(45) Date of Patent: Nov. 29, 2011

(54) METHOD FOR CONTROLLING DIGITALLY STORABLE AND PREDEFINABLE EVENTS ON A COMPUTER SYSTEM

(75) Inventor: Thomas Leiber, Copenhagen (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 10/556,300

(22) PCT Filed: Apr. 27, 2004

(86) PCT No.: PCT/DE2004/000874
§ 371 (c)(1),
(2), (4) Date: Nov. 11, 2005

(87) PCT Pub. No.: WO2004/104622
PCT Pub. Date: Dec. 2, 2004

(65) Prior Publication Data
US 2006/0282496 A1   Dec. 14, 2006

(30) Foreign Application Priority Data

May 14, 2003   (DE) .................................. 103 21 561

(51) Int. Cl.
*G01C 21/00*   (2006.01)

(52) U.S. Cl. ......................... 709/203; 701/209; 701/210

(58) Field of Classification Search .................. 709/218, 709/219, 224, 225–229, 238–244; 701/209, 701/210
See application file for complete search history.

(56) References Cited

U.S. PATENT DOCUMENTS

| 4,954,958 | A | * | 9/1990 | Savage et al. ................. 701/202 |
| 5,206,641 | A | * | 4/1993 | Grant et al. ................... 340/905 |
| 5,206,811 | A | * | 4/1993 | Itoh et al. ..................... 701/211 |
| 5,621,662 | A | * | 4/1997 | Humphries et al. .......... 700/276 |
| 5,642,303 | A | | 6/1997 | Small et al. ................. 364/705.5 |
| 5,774,824 | A | * | 6/1998 | Streit et al. ................... 701/207 |
| 5,892,463 | A | | 4/1999 | Hikita et al. .................. 340/995 |
| 5,919,246 | A | | 7/1999 | Waizmann et al. ........... 701/209 |
| 6,259,381 | B1 | | 7/2001 | Small ............................ 340/988 |
| 6,392,548 | B2 | | 5/2002 | Farringdon et al. ........ 340/573.1 |
| 6,526,349 | B2 | * | 2/2003 | Bullock et al. ................ 701/209 |
| 6,542,077 | B2 | * | 4/2003 | Joao ........................ 340/426.16 |

(Continued)

FOREIGN PATENT DOCUMENTS

DE   197 18 106   3/1998

(Continued)

OTHER PUBLICATIONS

Computer Generated English Translation of JP2008-292498 A.*

(Continued)

*Primary Examiner* — Kevin Bates
(74) *Attorney, Agent, or Firm* — Leydig, Voit & Mayer, Ltd.

(57) ABSTRACT

A method for controlling digitally storable events on a computer system that can be accessed via the Internet, the events being predefinable by a user, includes receiving movement information of a user. Route information is recorded digitally in a user-specific manner so as to save a starting point and an end point. A digitally stored event is associated user-specifically with at least one item of the route information that determines a digitally controlled process. The route information is used at an early point in time to determine which of a plurality of routes is being traveled so as to determine the digitally stored event and start the digitally controlled process.

17 Claims, 3 Drawing Sheets

U.S. PATENT DOCUMENTS

| | | | |
|---|---|---|---|
| 6,549,130 B1 * | 4/2003 | Joao | 340/539.14 |
| 6,643,581 B2 * | 11/2003 | Ooishi | 701/207 |
| 6,678,613 B2 * | 1/2004 | Andrews et al. | 701/213 |
| 6,807,483 B1 * | 10/2004 | Chao et al. | 701/210 |
| 6,922,629 B2 * | 7/2005 | Yoshikawa et al. | 701/117 |
| 6,947,976 B1 * | 9/2005 | Devitt et al. | 709/219 |
| 7,073,129 B1 * | 7/2006 | Robarts et al. | 715/740 |
| 7,130,743 B2 * | 10/2006 | Kudo et al. | 701/209 |
| 7,203,598 B1 * | 4/2007 | Whitsell | 701/210 |
| 7,373,243 B2 * | 5/2008 | Tengler et al. | 701/201 |
| 7,409,233 B2 * | 8/2008 | Pritchard | 455/567 |
| 7,412,327 B2 * | 8/2008 | Kauvo et al. | 701/209 |
| 2004/0172172 A1 | 9/2004 | Kubota et al. | 701/1 |

FOREIGN PATENT DOCUMENTS

| | | |
|---|---|---|
| DE | 198 49 194 | 4/2000 |
| DE | 100 37 852 | 2/2002 |
| DE | 101 49 285 | 4/2003 |
| EP | 0 697 686 | 2/1996 |
| EP | 1 081 620 | 3/2001 |
| GB | 2 326 751 | 12/1998 |
| GB | 2 363 943 | 1/2002 |
| WO | WO03/014670 * | 2/2003 |
| WO | WO 03/014671 | 2/2003 |
| WO | WO 03/014671 A1 * | 2/2003 |
| WO | WO 03/029053 | 4/2003 |

OTHER PUBLICATIONS

N. Marmasse: "comMotion: a context-aware communication system"; CHI'99 Conference Proceedings, Human Factors in Computing Systems, New York, NY: ACM, US, May 15, 1999, pp. 1-2, XP002226460.

International Search Report for PCT/DE2004/000874 (4 pages).

German Search Report for DE 103 21 561.1 (3 pages) and brief translation thereof (1 page).

* cited by examiner

METHOD FOR CONTROLLING DIGITALLY STORABLE AND PREDEFINABLE EVENTS ON A COMPUTER SYSTEM

The present invention relates generally to a method for controlling digitally storable events on a computer system that can be accessed via the Internet. In particular, the events can be predefined by a user and can then be controlled as a function of movement information of the user that is transmitted by means of a mobile terminal device.

BACKGROUND

Owing to the ever-increasing use of mobile terminal devices, a user who is carrying such a device can be located at any time. Numerous inventions already exist that make use of such information in order to send information to the user.

SUMMARY OF THE INVENTION

An object of the present invention is to provide a method for controlling digitally storable events on a computer system that allows users to determine on their own which information they require, whereby a predictive approach is advantageous.

The present invention provides a method for controlling digitally storable events on a computer system that can be accessed via the Internet, the events being predefinable by a user. The method includes:
  receiving movement information of a user;
  recording route information digitally in a user-specific manner so as to save a starting point and an end point;
  associating a digitally stored event, user-specifically, with at least one item of the route information that determines a digitally controlled process; and
  using the route information to determine which of a plurality of routes is being traveled so as to determine the digitally stored event and start the digitally controlled process.

The invention describes in detail how the movement behavior of users can be recorded and rendered useable for later utilization. In this context, various possibilities for acquiring geographic tracking data are presented. The data thus collected is stored in certain movement cases in order to control the further program execution later on, especially on the basis of statistical empirical values.

In this context, the recording of movement cases does not have to relate exclusively to natural persons but can also address any type of suitable receiver. Hereinafter, however, the term "user" will be employed for the sake of simplicity.

In particular, this is a method for controlling digitally storable and controllable events that have been specified by a user. The user's movement information is transmitted by a mobile terminal device. The method encompasses the following steps: in a first step, route information is recorded and stored in a user-specific manner. In a simple embodiment, only the starting point and the end point are saved, whereby in the preferred embodiment, the time of day and the frequency are also digitally stored. Moreover, intermediate points are stored from which a rough route course can be read out. The number of intermediate points is determined by the tracking interval. In a subsequent step, the user associates events that determine digitally controlled processes with one or more items of route information. In this manner, it is possible for the user to have an influence on the event and on the process allowed by the latter. Possible responses are, for instance, that if there is a traffic jam on the route being traveled, a message to this effect or a phone call is to be generated in which an alternative route is proposed. For such an event to be triggered, in another step, the determined route information is employed at an early point in time, particularly by means of statistical methods, to determine which road the user has taken. Once a determination has been made, it is checked whether an event has been stored for this route. If such an event has been defined, then the digital process linked to this event is started. It should be pointed out here that the statistical evaluation likewise exerts an influence on the length of the tracking intervals. If a road has been selected that has been frequently traveled before, then a longer interval for the tracking should be selected. In contrast, if a new and unfamiliar road has been taken, these intervals are smaller so that reliable information can be collected for future statistical computations.

In the current embodiment, ascertained tracking information is transmitted by the mobile terminal device to the computer system via GPS or else the mobile terminal device is tracked on the basis of geographic coordinates of ground stations that then carry out the transmission.

The following actions can be considered as a small range of possible processes: the triggering of calls, MMS, SMS, e-mails, whereby information such as analyzed product information offered in the vicinity of the route, route optimizations or traffic jam reports can all be transmitted.

Another alternative consists of starting user-defined programs which, if applicable, have been set up by the users themselves and which, for example, control a heating or air-conditioning system at the destination or at the departure site or else control a telephone system, especially call forwarding or an answering machine, or a home-security system. It should be pointed here that this is not a complete listing of all of the possibilities.

In a preferred embodiment, the route information can also be entered manually, so that the user has the possibility to predefine routes, preferably via a Web interface. As a rule, however, preference will be given to automatic monitoring and registration.

The possibility also exists to control user entries for events or localization control or route information via a web/WAP interface.

The information is stored in databases so as to simplify the data management. In order to attain the fastest possible access to the information thus stored, it is necessary to employ unambiguous identification characteristics. An unambiguous characteristic is, for example, the cell phone number as the ID for the user information.

Another part of the present invention is a computer system with a means that allows the method to run according to one or more of the method claims. This system consists basically of three components. On the one hand, it consists of the memory system for storing user data. On the other hand, it consists of the memory system for storing route information. In this context, one memory system can be used for all of the route information since it is often the case that the routes of several users overlap in the road network in question. Therefore, referencing the routes with starting points and end points makes it possible to determine the routes quite precisely without the need for managing large volumes of data. Another area serves to store the events and the processes associated with the events. In a preferred embodiment, the user is provided with a plurality of standard processes that have to be parameterized individually. Thus, in this case as well, the need for data memory is reduced. However, it is also conceivable for users to define their own programs, especially scripts (Perl, PHP), which are then carried out when the event occurs.

BRIEF DESCRIPTION OF THE DRAWINGS

The present invention will be explained in greater detail below with reference to examples of embodiments that are schematically shown in the drawings. The same reference numerals are given to the same elements in the individual figures. The following is shown specifically.

DETAILED DESCRIPTION

Numerous modifications and refinements of the described embodiments can be realized within the scope of the invention.

Figure 1:
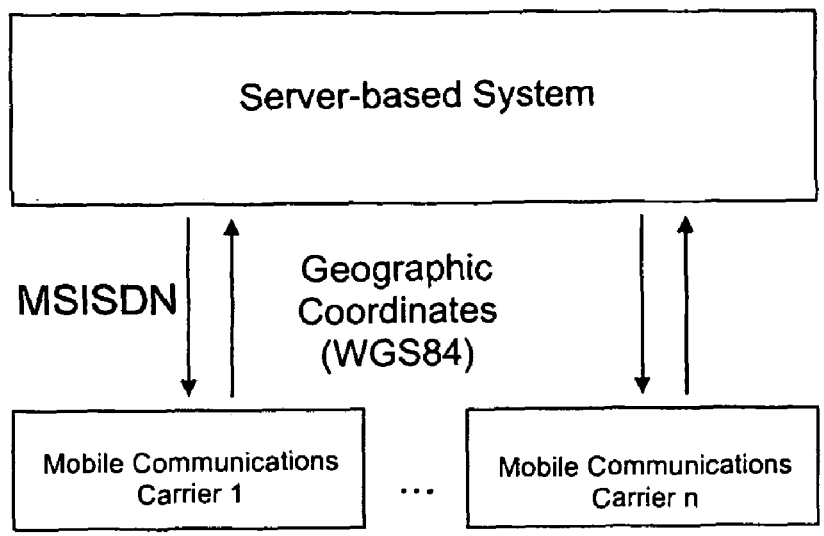
FIG. 1—a schematic depiction of the determination of the tracking information, whereby the mobile communications systems, especially the ground stations, are used in order to determine the position.
Figure 2:
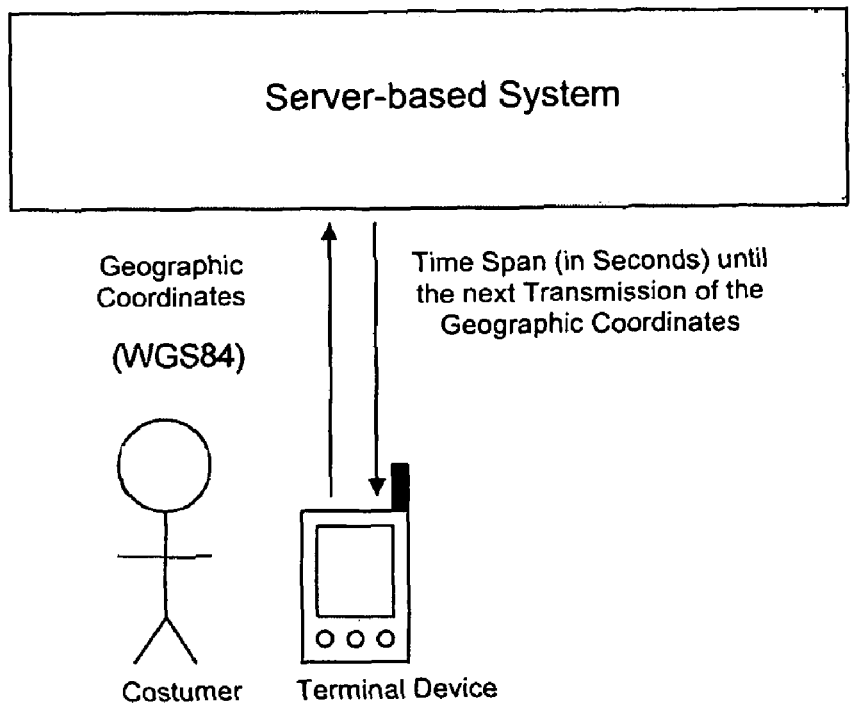
FIG. 2—an alternative embodiment for determining the position of a terminal device, characterized in that the user runs a program on her/his terminal device that transmits the position.

On the basis of FIG. 1, a user is registered at a server-based system provided with a function according to the invention and said user has declared that she/he is in agreement that her/his position (geographic coordinates) be ascertained at irregular intervals and stored. Moreover, she/he either has a mobile terminal device that is localization-capable by means of a server-based system (cellular phone, smartphone, MDA, etc.) or else she/he has a terminal device that is capable of autonomously transmitting cell coordinates or geographic coordinates to a server. The latter types of devices have to have an especially adapted application installed in them (FIG. 2).

In a preferred embodiment, the user always has the possibility (also in a mobile manner) to stop the localization process that is continuously running in the background as well as to delete the data that has been stored in the form of movement cases.

When it comes to the technical boundary conditions on the user's side, the following alternatives are conceivable:

Mobile Terminal Device without Application:

The customer has only a terminal device that is neither GPRS-capable nor has the capability of being connected to an (external) GPS receiver. Moreover, it is not possible or desirable to install an application on the terminal device that communicates with the system according to the invention.

The starting point for the tracking in this case consists of the interfaces to mobile communications providers to which the applicable phone numbers (MSISDN) are transferred and which send back a response in the form of geographic coordinates (normally in the WGS84 format) (FIG. 1).

In this case, the customer can only terminate the geotracking that is running in the background by establishing a connection via GUI-based interfaces such as Web portal, WAP portal or Voice Portal, where she/he can use the options available there to terminate the service.

In this case, localization is initiated by the server system.

Mobile Terminal Device with Application:

In this embodiment, which is shown in FIG. 2, the customer has a terminal device that is capable of transmitting geographic coordinates to a server-based system. The geographic coordinates can be obtained by reading out the GPRS header or by an (external) GPS receiver. For this purpose, a small application has to be installed on the terminal device that ensures autonomous transmission of the geographical coordinates to the server system. As is shown in FIG. 2, the terminal device or the application receives in return a time value (for instance, an integer) that indicates when the next transmission of the current geographic coordinates is to take place. Normally, this is a value in the order of magnitude of seconds or milliseconds.

In this case, the customer has the possibility to end the geotracking via the application installed on the terminal device by either making a GUI-based adjustment or by terminating the application.

In this case, the localization is initiated by the terminal device or by the application installed on the terminal device.

Figure 3:
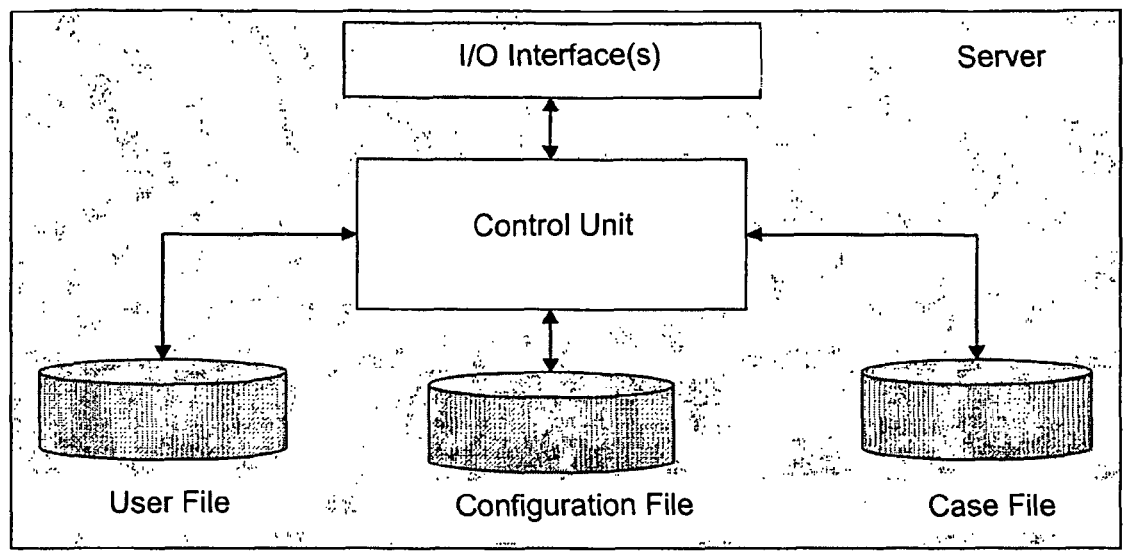
FIG. 3—a schematic depiction of the set-up of the server that provides the information needed to execute the method according to the invention.

Technical Boundary Conditions on the Server Side:

The technical configuration of the server has been kept relatively general here since different set-ups and/or requirements can be made of the server system. The basic components described below, however, are basically present (see FIG. 3). The individual entries can be stored in a database as well as in the file system.

The I/O (input/output) interfaces serve to allow interaction with other systems or applications. These could be, for example, a Web server that prepares the entire system that is to be controlled or modified for a Web browser and thus gives users the capability to communicate with the system. Other interfaces can be voice servers or WAP servers (Wireless Application Protocol) which likewise prepare the system to be controlled in the form of a GUI (Graphical User Interface) for the user as a function of the terminal device. In order to communicate with other servers or other terminal devices on the application level, for instance, in order to transmit geographic coordinates, the server is also connected to these interfaces (application-to-application interfaces). There are also interfaces to gateways that deliver messages that are to be sent to the pertinent terminal devices.

Data about all of the users of the system is stored in the user area. An important entry in the user database is the (cellular) phone number, on the basis of which the user can be unambiguously identified in case of a tracking query or request.

Movement cases and/or behavior cases of users are stored in the case database. All of the cases are associated with users in the user database. Case data serves as a decision-making support for the control unit.

Various kinds of reference data are stored in the configuration database. The reference data constitutes the decision-making basis for the control unit. Reference data usually consists of configurations and settings established by the users themselves. A setting could be, for instance, that the user would like to be informed by cell phone when she/he is at a certain geographic location.

The control unit decides how the information that is stored in the three files is offered to the outside via the interfaces. On the basis of the case information available about a given user, the control unit computes probabilities about her/his future behavior and then makes decisions about the further execution on the basis of the configuration data.

As already mentioned above, movement cases or behavior cases are stored in the case database. In individual cases, information as to when a customer moves from a starting point to an end point within what timeframe is recoded.

On the basis of the basic data thus obtained, additional information can be generated that facilitates the behavior analyses. These can be, for example, the following items of information:

date
day of the week
speed of movement (average speed)
classification information (for example, regularities)

Figure 4:
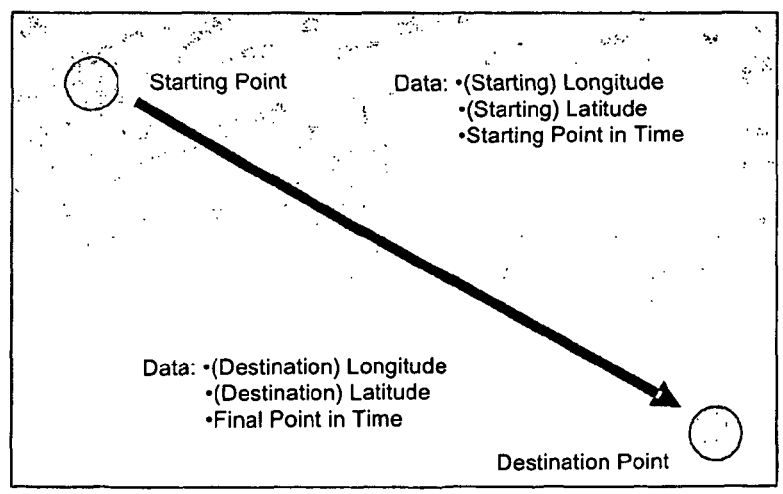
FIG. 4—an example of a movement case, wherein only the starting point and the destination point are recorded.

Since people usually do not move exactly in a straight line as is shown in FIG. 4, subcases that record the exact path of movement can exist for each case. The intermediate points entered in this process are the geographic locations where the user is at the point in time of a tracking procedure.

Figure 5:
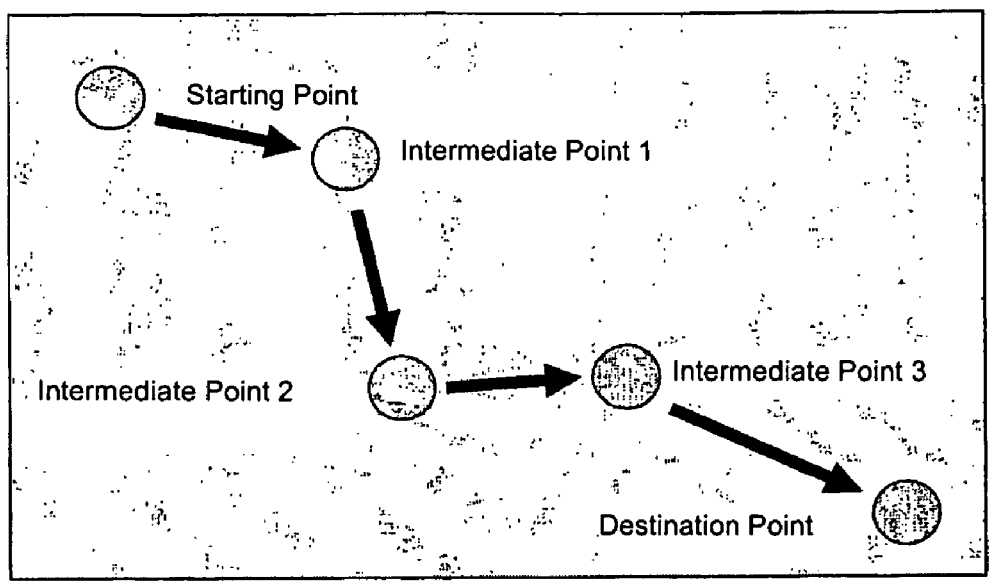
FIG. 5—an alternative example of a movement case wherein intermediate points are additionally recorded.

The route shown in FIG. 5 is made up of four individual subcases that are cumulated to form a "large" case (FIG. 4).

The decision as to when a case is stored or when the destination point has been reached is made by the control unit. Usually, the destination point has been reached when the user has no longer moved during a certain period of time. Once the case has been stored, it serves as an empirical value for predicting future movements.

In the above-mentioned control unit, decisions about the localization course and the further program execution are made on the basis of data that is already existent or, in fact, data that the control unit does not even have. The control unit is additionally influenced by the settings of the user.

A possible example is that a user h goes from A to B every day at approximately the same time. As soon as she/he has started the route at A, a new movement case is opened. The control unit checks the data against the cases already present and computes that the user is very likely to arrive at location B at a certain point in time. For this reason, the tracking intervals can be quite large. This saves, among other things, computation time and localization fees that might by charged.

If the user has indicated in her/his configuration settings that she/he would like to be informed if there is a hindrance on the route from A to B and if this is actually the case, the user will then be informed to this effect in a timely fashion. Configuration settings can also be stored in the form of product requests, whereby it has been set that the user would like to be informed via her/his mobile terminal device when a product bearing the desired properties is on her/his route.

For this purpose, the control unit checks the set configuration and case data of the user and informs the user on the basis of the receiving channels she/he has likewise set. The control unit is also capable of transmitting action recommendations (for example, alternate routes) to the user.

The acronyms used throughout this Specification, and referenced in the Figures, are used in accordance with the meanings that would be understood by one skilled in the art. For example, the following acronyms as used in the Specification and Figures may have the following meanings:
GPS=Global Positioning System
MMS=Multimedia Messaging Service
SMS=Short Messaging Service
WAP=Wireless Access Point or Wireless Application Protocol
MDA=Mail Delivery Agent
GPRS=General Packet Radio Service
MSISDN=Mobile Subscriber Integrated Service Digital Network Number
WGS84=World Geodetic System 84
GUI=Graphical User Interface The various methods and/or processes embodying the present invention can be recorded as executable program steps on a digital media for a computer system.

The invention claimed is:

1. A method for controlling digitally storable events on a computer system that can be accessed via the Internet, the events being predefinable by a user, the method comprising:
   receiving movement information of the user;
   recording route information digitally in a user-specific manner by saving at least a starting point and intermediate points, the number of intermediate points being determined by a tracking interval;
   associating a digitally stored event, specified by the user through a mobile device, with at least one item of the route information stored on a server of the computer system remote from the mobile device, wherein the digitally stored event determines a digitally controlled process;
   performing statistical computations on the received user movement information and the user-specific recorded route information so as to recognize a route being traveled by the user;
   determining a length of the tracking interval based on a frequency of the recognized route being traveled by the user;
   storing, in advance of the performing statistical computations step, an end point of the movement information; and
   using the recognized route being traveled so as to determine the digitally stored event and start the digitally controlled process.

2. The method as recited in claim 1 further comprising digitally saving respective times of day and a recording frequency corresponding to the recording of the route information.

3. The method as recited in claim 1 further comprising transmitting the movement information to a computer system via a Global Positioning System using a mobile terminal device.

4. The method as recited in claim 1 further comprising tracking the mobile terminal device by ground stations using geographic coordinates and then transmitting the geographic coordinates.

5. The method as recited in claim 1 wherein the digitally controlled process includes at least one of a triggering of a call, a triggering of a Multimedia Messaging Service, a triggering of a Short Messaging Service, a triggering of an e-mail message, and a starting of a user-defined and linked program so as to transmit at least one of an analyzed product information offered in the vicinity of a route, a route optimization, and a traffic jam report.

6. The method as recited in claim 1 wherein the system includes at least one of a heating or air-conditioning system at the starting point and/or the end point, a telephone system, and a home-security system.

7. The method as recited in claim 6 wherein the telephone system includes at least one of a call forwarding and an answering machine.

8. The method as recited in claim 1 wherein the recording is performed by entering the route information manually or by recording the route information automatically during a movement of the user, the automatic recording being controllable by the user.

9. The method as recited in claim 1 further comprising controlling at least one of a user entry for the digitally stored event, a localization control, and the route information via a web/Wireless Application Protocol interface.

10. The method as recited in claim 1 further comprising using a cell phone number of a user as an identification for the route information so as to enable digital data management.

11. The method as recited in claim 1 wherein the recording route information includes storing geographic intermediate points, a tracking interval of the intermediate points being manually or automatically specifiable, and further comprising designating an intermediate point as the end point when a certain period of time of geographic inactivity has been exceeded.

12. The method as recited in claim 1 wherein the using the route information is performed at an early point in time.

13. A non-transitory computer readable medium having stored thereon computer executable process steps operative to perform a method for controlling digitally storable events on a computer system that can be accessed via the Internet, the events being predefinable by a user, the method comprising:

receiving movement information of the user;

recording route information digitally in a user-specific manner by saving at least a starting point and intermediate points, the number of intermediate points being determined by a tracking interval;

associating a digitally stored event, specified by the user through a mobile device, with at least one item of the route information stored on a server of the computer system remote from the mobile device, wherein the digitally stored event determines a digitally controlled process;

performing statistical computations on the received user movement information and the user-specific recorded route information so as to recognize a route being traveled by the user;

determining a length of the tracking interval based on a frequency of the recognized route being traveled by the user;

storing, in advance of the performing statistical computations step, an end point of the movement information; and using the recognized route being traveled so as to determine the digitally stored event and start the digitally controlled process.

14. The non-transitory computer readable medium as recited in claim 13 wherein the method further comprises transmitting the movement information to a computer system via Global Positioning System using a mobile terminal device.

15. The non-transitory computer readable medium as recited in claim 13 wherein the method further comprises digitally saving respective times of day and a recording frequency corresponding to the recording route information.

16. The non-transitory computer readable medium as recited in claim 13 wherein the method further comprises tracking the mobile terminal device by ground stations using geographic coordinates and then transmitting the geographic coordinates.

17. The non-transitory computer readable medium as recited in claim 13 wherein the using the route information is performed at an early point in time.

* * * * *